United States Patent [19]
Hunsucker

[11] 3,967,015
[45] June 29, 1976

[54] PROCESS FOR DYEING GLASS TEXTILES
[75] Inventor: Jerry H. Hunsucker, Terre Haute, Ind.
[73] Assignee: Commercial Solvents Corporation, Terre Haute, Ind.
[22] Filed: Apr. 1, 1974
[21] Appl. No.: 457,027

Related U.S. Application Data
[63] Continuation-in-part of Ser. No. 296,400, Oct. 10, 1972, abandoned.

[52] U.S. Cl. ........................................ 427/386; 8/8; 260/22 EP; 260/28 R; 260/29.2 EP; 260/307 F; 427/390; 427/394; 427/412; 427/416; 427/430; 427/443; 428/273; 428/415
[51] Int. Cl.² .................. C03C 25/02; B05D 1/38; D06P 3/80; B32B 17/04
[58] Field of Search............ 8/8; 260/75 N, 29.2 EP, 260/22 EP, 307 F, 28; 117/126 GB, 76 T, 126 GE, 161 ZB; 428/273, 415; 427/386, 412, 30 B, 390 A, 416, 443, 394

[56] References Cited
UNITED STATES PATENTS

| | | | |
|---|---|---|---|
| 2,722,489 | 11/1955 | Hennessey | 8/8 |
| 2,887,459 | 5/1959 | Carmody | 117/161 ZB |
| 2,903,381 | 9/1959 | Schroeder | 117/161.2 B |
| 3,027,341 | 3/1962 | Boucher | 260/22 EP |
| 3,056,705 | 10/1962 | Wong | 117/126 GB |
| 3,249,412 | 5/1966 | Kolek | 117/126 GB |
| 3,336,253 | 8/1967 | Wong | 117/126 GB |
| 3,389,145 | 6/1968 | Katz | 260/307 F |
| 3,409,577 | 11/1968 | Wong | 117/126 GB |
| 3,427,266 | 2/1969 | Phillips | 260/22 EP |
| 3,449,281 | 6/1969 | Sullivan | 117/126 GE |
| 3,652,326 | 3/1972 | Ward | 117/126 GE |

*Primary Examiner*—Michael R. Lusignan
*Assistant Examiner*—William H. Schmidt
*Attorney, Agent, or Firm*—Robert H. Dewey; Howard E. Post

[57] ABSTRACT

A process for dyeing fiberglass by the steps of applying thereto a combination consisting of a substituted oxazoline and a thermosetting epoxy resin, heating at about 270°–300°F and applying a disperse, or an acid dye or a vat dye thereto.

12 Claims, No Drawings

PROCESS FOR DYEING GLASS TEXTILES

CROSS REFERENCE TO RELATED APPLICATIONS

This application is a continuation-in-part of Ser. No. 296,400 filed Oct. 10, 1972, now abandoned.

BACKGROUND OF THE INVENTION

This invention relates to an improved process for dyeing fiberglass. In a particular aspect this invention relates to the step of coating the fiberglass with dyeable composition then exposing the coated fiberglass to the dye.

Fiberglass is a woven fabric made from yarn spun from hair-like strands of glass. The glass is inert to most substances and does not accept dyes. It is conventional to coat the fiberglass with a thermosetting resin which accepts the dye. This process has been relatively successful, but it suffers from several disadvantages. The thermosetting resins previously used were not sufficiently insoluble to permit the fabric to be repeatedly dry-cleaned and therefore had to be laundered. Another difficulty is that of "crocking" which results from friction causing loss of the dyed coating from the surface. Another problem was the color of the baked resin. It was essential that the resin be pale in color after curing so that it would not distort the colors of the dyes.

SUMMARY OF THE INVENTION

It is an object of this invention to provide an improved process for dyeing fiberglass.

It is another object of this invention to provide an improved thermosetting coating composition for coating the glass fibers.

Other objects will be apparent to those skilled in the art from the description herein.

An improvement has been discovered in the process for dyeing glass fibers (fiberglass) by the steps of coating the fibers with an adherent, thermosetting coating receptive to dye, heating to cure the coating and applying a dye thererto. The improvement of the present invention comprises using as the coating a mixture of a thermosetting epoxy ester resin, and a substituted oxazoline represented by the formula:

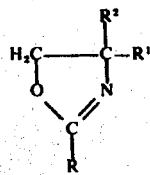

where R is heptadecyl and $R^1$ and $R^2$ can be methyl, ethyl, hydroxymethyl, or the group

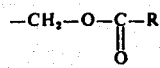

and can be the same or different.

DETAILED DISCUSSION

The thermosetting epoxy ester employed in the practice of this invention is known in the art, viz. see "DMPA in Water-Soluble Resins and Other Compounds" published by Commercial Solvents Corporation, and is available commercially under the trademark AQUAMAC WX 363-M from McWhorter Chemical Company, 4415 West Harrison St., Hillside, Ill. 60162. It is the resinous product obtained by heating an epoxy resin, $C_{18}$ mixed unsaturated fatty acids, trimethylolethane, phthalic anhydride and DMPA. The resin is prepared for use by dispersing in water, adding an alkanolamine, e.g. 2-amino-2-methyl-1-propanol or other amine, to solubilize it and then diluting to 15% by weight of resin.

The epoxy resin used in preparing the water soluble resin used in the practice of this invention is a diglycidyl ether of bisphenol A having an epoxide equivalent of from about 190 up to 525. Numerous commercial products are available in this category, among which can be mentioned EKRA-2002 from Bakelite Co.; Araldite 6005, 6010, 6020, 6030, 6040, 6060 and 6071 from Ciba-Geigy Corp.; and EPON 820, 828, 834, 864 and 1001 from Shell Chemical Co.

The mixed unsaturated fatty acids useful in the practice of this invention include mixtures of $C_{18}$ acids, namely oleic, linoleic and linolenic acids. The fatty acids obtained from linseed oil are preferred.

The substituted oxazolines suitable for the practice of this invention include 4,4-dimethyl-2-heptadecyl-2-oxazoline, commercially available as Wax TS-254; 2-heptadecyl-4-ethyl-4-hydroxymethyl-2-oxazoline commercially available as Wax TS-254A; 2-heptadecyl-4,4-bis(hydroxymethyl)-2-oxazoline, commercially available as Wax TS-254AA or 4,4-bis(octadecanoyloxymethyl)-2-heptadecyl-2-oxazoline, commercially available as Wax TS-970. These waxes are available from Commercial Solvents Corporation, 245 Park Ave., New York, N.Y. 10017 or they can be readily prepared by reacting an alkanolamine with stearic acid according to the method of Purcell. For use in preparing the mixture with WX-363-M, the wax is prepared as a 15% by weight emulsion in water as described in either of the following procedures.

An anionic emulsion was prepared according to the following procedure: Wax TS-970 15 g, tall oil fatty acids 2 g (FA-3 marketed by Arizona Chemical Company), and 2-heptadecenyl-4,4-bis(hydroxymethyl)-2-oxazoline were transferred to a beaker and heated to 125°–130°C, whereupon the mixture melted. Then 2-amino-2-methyl-1-propanol 2 g, and water 100 g (previously heated nearly to boiling) were added gradually to the melt with continual stirring. The mixture was then allowed to cool while stirring was continued.

In an alternate procedure for a non-ionic emulsion, Wax TS-970 40 g and nonylphenoxypoly (ethyleneoxy)ethanol 5 g were melted together by heating to 125°–130°C. 2-Amino-2-methyl-1-propanol 2 g was then added. Water 275 g, was heated to near boiling and the wax mixture was slowly added with continual stirring and the mixture was allowed to cool to 60°C. Then a blend of 3 g of nonylphenoxypoly(ethyleneoxy)-ethanol and 3 g of 2-heptadecenyl-4,4-bis(hydroxymethyl)-2-oxazoline added and stirring was continued until the mixture was cool.

The ratio in which WX-363-M resin and the wax are employed can vary from 9:1 to 1:9. The wax can be used to control the degree of dye pick-up, because it is the resin WX-363-M which attracts and holds the dye. However, as the resin content is increased, the coating becomes gradually more brittle. It has been found that generally a 1:1 mixture gives the most satisfactory results.

In the practice of this invention, the resin-wax combination is applied to the fiberglass textile by any suitable means, many of which are known, preferably by immersion of the fabric in an aqueous emulsion of the combination. The combination can also be dissolved in a solvent for application to the textile, but for reasons of safety, the emulsion is preferred.

Excess emulsion is allowed to drain from the textile, or it is removed by passing the textile between rollers under pressure, as is known. The textile is then baked at about 270°–300°F for 15–30 minutes, immersed in a dye bath, e.g. for about 30 minutes – 60 minutes at 70°C, washed and dried.

Dyes suitable for the practice of this invention include disperse, acid, and vat dyes. Reactive dyes, wherein the dye reacts chemically with the fiber, are unsuited for dyeing fiberglass in general and those and basic dyes are not suitable for the practice of this invention.

The invention will be better understood with reference to the following examples. It is understood, however, that the examples are intended for illustration only and it is not intended that the invention be limited thereby.

EXAMPLE 1

Resin WX-363-M was prepared as follows. Into a reaction vessel equipped with an agitator, a distillation column, an azeotrope head and a water-cooled condenser, there was charged an epoxy resin, 11.5 parts (Araldite 6004 made by Ciba-Geigy Corp. was used), linseed oil fatty acids 31.0 parts (mixed $C_{18}$ unsaturated acids) and xylene, ad lib. The mixture was heated to 221°C until the acid number was 84–86 while separating the xylene-water azeotrope and recycling the xylene to the pot. Trimethylolethane 15.5 parts and 2,2-dimethylolpropionic acid 12.0 parts. The mixture was reheated to about 199°–200°C and phthalic anhydride, 30 parts was added. The mixture was then heated at 212°–213°C until an acid number of 56–58 was obtained, while continuing to separate water. The residual xylene was then separated and after cooling, isobutyl alcohol, 37 parts, was added to thin the mixture. Then a mixture of melamine 21.2 parts and dimethylolethane 1.2 parts dissolved in 29 parts of isobutyl alcohol was added and the product was thoroughly mixed.

The above amounts are not highly critical and considerable departure therefrom can be made without adverse effects.

A portion of the above resin solution was dispersed in sufficient water to provide 15% by weight solids whereupon the resin precipitated. 2-Amino-2-methyl-1-propanol was then slowly added with agitation until the resin dissolved.

A sample of commercial grade wax TS-970 was emulsified to provide a concentration of 15% by weight of the wax by the anionic procedure.

The resin solution and wax emulsion were employed in dyeing fiberglass as follows.

A piece of glass cloth was immersed in a mixture of resin solution and wax emulsion at a ratio of 50:50 until it was thoroughly wet. It was then passed through a pair of rollers to remove excess mixture and was heated at 275° for 15 minutes. The procedure was repeated with fresh pieces of cloth using resin:emulsion ratios of 40:60, 30:70, and 20:80 respectively.

These pieces of treated cloth were then dyed by immersion in a disperse dye solution prepared as follows from Yellow-WLS dye made by Southern Dyestuff Company, Charlotte, N.C.:

| | |
|---|---|
| Dye powder | 5 parts |
| $NaH_2PO_4$ | 20 |
| CO-630 | 10 |
| Octylphenol | 2 |
| Water, q.s. to | 1500 |

The dye bath was heated to 205°F and the glass cloth was held there with mild agitation for 30 to 90 minutes. The glass cloth was washed in clear water without detergent and dried at room temperature.

At a 50:50 resin:wax mixture the dye pick-up was determined to be good, and it was acceptable at 40:60 and 30:70 ratios also. At 20:80 it was unacceptable. The glass cloth bearing the 50:50 resin:wax mixture was determined to have excellent resistance to crocking when compared with a commercial sample, and advantageously had superior "hand."

EXAMPLE 2

The experiment of Example 1 was repeated in all essential details except that Wax TS-254 was substituted for Wax TS-970, and the glass cloth was coated only with a 1:1 mixture of resin:wax. The dye pick-up was determined to be good. The hand and resistance to crocking were excellent.

EXAMPLE 3

The experiment of Example 2 was repeated in all essential details except that Wax TS-254A was substituted for Wax TS-254. The dye pick-up was acceptable. The hand and resistance to crocking were excellent.

EXAMPLE 4

The experiment of Example 2 was repeated in all essential details except that Wax TS-254AA was substituted for Wax TS-254. The dye pick-up was acceptable. The hand and resistance to crocking were excellent.

EXAMPLE 5

The experiment of Example 1 was repeated in all essential details except that disperse dye Navy Blue Res made by Southern Dyestuff Company was substituted for the Yellow WLS. The dye pick-up was excellent.

EXAMPLE 6

The experiment of Example 5 was repeated in all essential details except that Wax TS-254 was substituted for Wax TS-970. The dye pick-up was acceptable.

EXAMPLE 7

The experiment of Example 5 was repeated in all essential details except that Wax TS-254A was substituted for Wax TS-970. The dye pick-up was acceptable.

EXAMPLE 8

The experiment of Example 5 was repeated in all essential details except that Wax TS-254AA was substituted for Wax TS-970. The dye pick-up was acceptable.

EXAMPLE 9

The experiment of Example 1 was repeated in all essential details except that disperse dye Orange Y made by Southern Dyestuff Company was substituted for the Yellow WLS. The dye pick-up was very good.

EXAMPLE 10

The experiment of Example 9 was repeated in all essential details except that Wax TS-254 was substituted for Wax TS-970. The dye pick-up was very good.

EXAMPLE 11

The experiment of Example 9 was repeated in all essential details except that Wax TS-254A was substituted for Wax TS-970. The dye pick-up was very good.

EXAMPLE 12

The experiment of Example 9 was repeated in all essential details except that Wax TS-254AA was substituted for Wax TS-970. The dye pick-up was very good.

EXAMPLE 13

An acid dye solution was prepared from Acid Green L Extra made by Allied Chemical Company, New York, New York, as follows:

| | |
|---|---|
| Water | 1000 parts |
| Dye | 5 |
| Sodium sulfate | 100 |
| $H_2SO_4$ q.s. to adjust pH to | 2.0 |

The experiment of Example 1 was repeated in all essential details except that the coated fiberglass was baked for 30 minutes. The above acid dye bath was substituted for the Yellow WLS, and the glass cloth was immersed at 200°F for 45 minutes. The dye pick-up was very good.

EXAMPLE 14

The experiment of Example 13 was repeated in all essential details except that acid dye Interfast Orange 2R made by Intracolor Corporation, Fairlawn, New Jersey, was substituted for Acid Green L Extra. The dye pick-up was very good.

EXAMPLE 15

An emulsion of Wax TS-970 was prepared by heating to boiling 80 g of water and 2 g of 2-amino-2-methyl-1-propanol. Meanwhile, Wax TS-970, 15 g, 2-heptadecenyl-4,4-bis(hydroxymethyl)-2-oxazoline 1 g, and tall oil FA-3 fatty acids (marketed by Arizona Chemical Company) 2 g were melted together and the melt was slowly added with agitation to the aqueous solution.

A solution of WX-363-M resin was prepared by adding 10 g of 2-dimethylamino-2-metyl-1-propanol 75 g of resin and diluting to 500 g with water. The emulsion of TS-970 and the solution of WX-363-M were then blended in a ratio of equal parts by weight. The glass fabric was immersed therein until thoroughly wet and passed between rollers under pressure to remove excess mixture. It was then baked at 275°F for 30 minutes.

A dye bath was prepared from vat dye Algosol Yellow GC-Z, made by Southern Dyestuff Company by the following formula:

| | |
|---|---|
| Dye | 16 g |
| Sodium hydroxide | 5 |
| Sodium thiosulfate | 2.5 |
| Sodium sulfate | 6 |
| Water, q.s. to | 1 liter |

The bath was heated to 120°–130°F and the coated fiberglass was immersed therein for one hour, washed in warm water and converted by immersion for about 20 minutes in a solution containing 30 g of 30% hydrogen peroxide in 500 g of water. The dye pick-up was excellent and the dyed textile showed excellent resistance to wet and dry crocking. It also showed good resistance to perchloroethylene dry cleaning solvent.

EXAMPLE 16

The experiment of Example 15 was repeated in all essential details except that vat dye Algosol Brilliant Violet 14-R made by Southern Dyestuff Company was substituted for the Yellow GC-Z. The dye pick-up was excellent. The dyed textile showed excellent resistance to wet and dry crocking and was unaffected by perchloroethylene.

EXAMPLE 17

The experiment of Example 15 was repeated in all essential details except that vat dye Algosol Brown 1 BR was substituted for Yellow GC-Z. The dye pick-up was excellent. The dyed textile showed excellent resistance to wet and dry crocking and was unaffected by perchloroethylene.

I claim:

1. In a process for dyeing a glass fiber textile by the steps of applying thereto a water-soluble thermosetting resin composition, heating to about 370°F for 30 minutes, immersing in a bath of disperse or acid dye at about 200°F for about 30 minutes and drying same, the improvement consisting of using as said resin composition a combination of (a) 60 parts of an oxazoline corresponding to the formula:

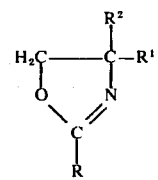

wherein R is heptadecyl and $R^1$ and $R^2$ can be methyl, ethyl, hydroxymethyl or the group

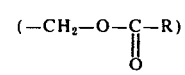

and can be the same or different, and (b) 40 parts of a thermosetting epoxy resin prepared by heating an epoxy resin with $C_{18}$ mixed unsaturated fatty acids, followed by heating with trimethylolethane and dimethylolpropionic acid, then heating with phthalic anhydride and solubilizing the resin thereby produced with 2-amino-2-methyl-1-propanol.

2. The process of claim 1 wherein $R^1$ and $R^2$ of said oxazoline are methyl.

3. The process of claim 1 wherein $R^1$ and $R^2$ of said oxazoline are hydroxymethyl.

4. The process of claim 1 wherein $R^1$ and $R^2$ of said oxazoline are

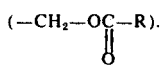

5. In a process for dyeing a glass fiber textile by the steps of applying thereto a water-soluble thermosetting resin composition, heating to about 370°F for 30 minutes, immersing in a bath of disperse or acid dye at about 200°F for about 30 minutes and drying same, the improvement consisting of using as said resin composition a combination of (a) 50 parts of an oxazoline corresponding to the formula:

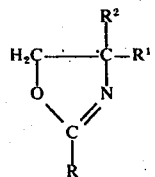

wherein R is heptadecyl and $R^1$ and $R^2$ can be methyl, ethyl, hydroxymethyl or the group

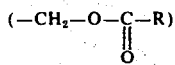

and can be the same or different, and (b) 50 parts of a thermosetting epoxy resin prepared by heating an epoxy resin with $C_{18}$ mixed unsaturated fatty acids, followed by heating with trimethylolethane and dimethylolpropionic acid, then heating with phthalic anhydride and solubilizing the resin thereby produced with 2-amino-2-methyl-1-propanol.

6. The process of claim 5 wherein $R^1$ and $R^2$ of said oxazoline are methyl.

7. The process of claim 5 wherein $R^1$ and $R^2$ of said oxazoline are hydroxymethyl.

8. The process of claim 5 wherein $R^1$ and $R^2$ of said oxazoline are

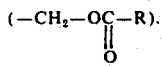

9. In a process for dyeing a glass fiber textile by the steps of applying thereto a water-soluble thermosetting resin composition, heating to about 370°F for 30 minutes, immersing in a bath of disperse or acid dye at about 200°F for about 30 minutes and drying same, the improvement consisting of using as said resin composition a combination of (a) 70 parts of an oxazoline corresponding to the formula:

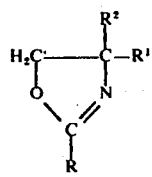

wherein R is heptadecyl and $R^1$ and $R^2$ can be methyl, ethyl, hydroxymethyl or the group

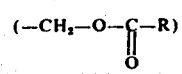

and can be the same or different, and (b) 30 parts of a thermosetting epoxy resin prepared by heating an epoxy resin with $C_{18}$ mixed unsaturated fatty acids, followed by heating with trimethylolethane and dimethylolpropionic acid, then heating with phthalic anhydride and solubilizing the resin thereby produced with 2-amino-2-methyl-1-propanol.

10. The process of claim 9 wherein $R^1$ and $R^2$ of said oxazoline are methyl.

11. The process of claim 9 wherein $R^1$ and $R^2$ of said oxazoline are hydroxymethyl.

12. The process of claim 9 wherein $R^1$ and $R^2$ of said oxazoline are

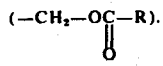

* * * * *

UNITED STATES PATENT OFFICE
CERTIFICATE OF CORRECTION

Patent No. 3,967,015                 Dated June 29, 1976

Inventor(s) Jerry H. Hunsucker

It is certified that error appears in the above-identified patent and that said Letters Patent are hereby corrected as shown below:

Column 1, line 43, "thererto" should read -- thereto --.

Column 5, line 56, "2-dimethylamino-2-metyl-1-propanol"

should read -- 2-dimethylamino-2-methyl-1-propanol --.

Signed and Sealed this twelfth Day of July 1977

[SEAL]

Attest:

RUTH C. MASON
Attesting Officer

C. MARSHALL DANN
Commissioner of Patents and Trademarks